US010927244B1

(12) United States Patent
Xue et al.

(10) Patent No.: US 10,927,244 B1
(45) Date of Patent: Feb. 23, 2021

(54) SUPERHYDROPHOBIC AND SELF-CLEANING RADIATIVE COOLING FILM AND PREPARATION METHOD THEREOF

(71) Applicant: Shaanxi University of Science & Technology, Shaan (CN)

(72) Inventors: Chaohua Xue, Shaanxi (CN); Bingying Liu, Shaanxi (CN); Huidi Wang, Shaanxi (CN); Shuntian Jia, Shaanxi (CN)

(73) Assignee: Shaanxi University of Science & Technology, Xi'an (CN)

( * ) Notice: Subject to any disclaimer, the term of this patent is extended or adjusted under 35 U.S.C. 154(b) by 0 days.

(21) Appl. No.: 16/679,144

(22) Filed: Nov. 8, 2019

(30) Foreign Application Priority Data

Aug. 21, 2019 (CN) .......................... 201910774588.9

(51) Int. Cl.
| | | |
|---|---|---|
| *C08L 27/00* | (2006.01) | |
| *B29C 41/00* | (2006.01) | |
| *C08L 27/16* | (2006.01) | |
| *C08L 27/20* | (2006.01) | |
| *C08J 5/18* | (2006.01) | |

(Continued)

(52) U.S. Cl.
CPC ............ *C08L 27/16* (2013.01); *B29C 41/003* (2013.01); *C08J 5/18* (2013.01); *C08L 27/20* (2013.01); *B29K 2027/12* (2013.01); *B29L 2007/008* (2013.01); *C08J 2327/16* (2013.01); *C08J 2327/20* (2013.01); *C08J 2483/04* (2013.01); *C08L 2203/16* (2013.01)

(58) Field of Classification Search
CPC .. C08L 5/18; C08L 27/16; C08L 27/20; C08L 2203/16; C08J 2327/16; C08J 2327/20; C08J 2483/04; B29C 41/003; B29L 2007/008; B29K 2027/12
See application file for complete search history.

(56) References Cited

FOREIGN PATENT DOCUMENTS

| CN | 108641155 A | 10/2018 |
|---|---|---|
| CN | 109852171 A | 6/2019 |

(Continued)

OTHER PUBLICATIONS

Kyoungjin et al. PDMS/PVDF hybrid electrospun membrane with superhydrophobic property and drop impact dynamics for dyeing wastewater treatment using membrane distillation, Journal of Membrane Science 525 (2017) 57-67 (Year: 2017).*

(Continued)

*Primary Examiner* — Bijan Ahvazi (57) ABSTRACT

Disclosed are a superhydrophobic and self-cleaning radiative cooling film and a preparation method thereof. The preparation method includes the following steps: 1) dissolving P ($VDF_x$-$HFP_y$) and PDMS in a composite polar solvent to obtain a translucent composite polymer solution of P ($VDF_x$-$HFP_y$)/PDMS; 2) adding a non-solvent dropwise to the obtained solution to allow for a phase separation of P ($VDF_x$-$HFP_y$)/PDMS to form a sol; 3) casting the sol; drying the cast sol to obtain a film are porous inside with micro/nano rough structures of low surface-energy on the surface. The preparation method of the present invention is simple, and can be used for large-scale production.

8 Claims, 3 Drawing Sheets

(51) Int. Cl.
    *B29L 7/00*           (2006.01)
    *B29K 27/12*        (2006.01)

(56)               References Cited

FOREIGN PATENT DOCUMENTS

| | | |
|---|---|---|
| CN | 109942865 A | 6/2019 |
| CN | 109968769 A | 7/2019 |
| CN | 109988467 A | 7/2019 |

OTHER PUBLICATIONS

S. M. Seidel, S. Jeschke, P. Vettikuzha and H.-D. Wiemhofer, PVDF-HFP/ether-modified polysiloxane membranes obtained via airbrush spraying as active separators for application in lithium ion batteries, Chem. Commun., 2015, 51, 12048-12051 (Year: 2015).*

* cited by examiner

SUPERHYDROPHOBIC AND SELF-CLEANING RADIATIVE COOLING FILM AND PREPARATION METHOD THEREOF

CROSS-REFERENCE TO RELATED APPLICATIONS

This application claims the benefit of priority from Chinese Patent Application No. CN201910774588.9, filed on Aug. 21, 2019. The content of the aforementioned application, including any intervening amendments thereto, is incorporated herein by reference in its entirety.

TECHNICAL FIELD

This application relates to superhydrophobic radiation cooling materials, and more particularly to a superhydrophobic and self-cleaning radiative cooling film and a preparation method thereof.

BACKGROUND OF THE INVENTION

Strong solar radiation often causes sharp rising of the temperature of ground objects in the hot summer. In recent years, global warming causes an increase of the earth temperature and an intensification of the urban heat island effect, so human is more dependent on electrical air conditioners, thereby increasing the energy consumption. Thus, it is necessary for human to find a cooling method which is low in energy consumption or even has no energy consumption.

Due to high solar reflectance and high mid-infrared emissivity, the radiative cooling material emits heat to the outer space through the transparent atmospheric window, which allows the radiative cooling material to be an energy-saving material. Such material can be applied on the roof or outside outdoor vehicles to lower the temperature in the space for human activity in summer, so that the thermal comfort of indoor environment is improved, and the use of equipment such as air conditioners is reduced, thereby reducing the consumption of power resources.

An existing construction film is used for cooling, which contains nanoparticles. Such construction film has cooling effect to some extent, but the layered coating thereof is high in cost and complicated for operating and the influence of the environment on cooling effect of the material is not taken into consideration. For example, rainwater influences the service time of the material, and the radiative cooling effect of the material is influenced when the material is wetted by water, and dusts in the air will influence the reflectance of the material and the mid-infrared emissivity.

If the radiative cooling material has a superhydrophobic property, that is, the water contact angle on a surface of the radiative cooling material is greater than 150°, and water drops slide easily on the surface of the radiative cooling material, taking away the dirt on the radiative cooling material during the sliding, thereby realizing self-cleaning function of the material. The superhydrophobic property can avoid the pollution of air pollutants and the impregnation of rainwater to the material surface, which is beneficial to maintaining high solar reflectance and high mid-infrared emissivity, avoiding premature degrading and aging of the material, thus prolonging the service life.

SUMMARY OF THE INVENTION

In order to overcome the defects in the prior art, the present invention provides a superhydrophobic and self-cleaning radiative cooling film and a preparation method thereof. The preparation method is simple, and can be used for large-scale production.

The present invention adopts the following technical solutions.

A preparation method of a superhydrophobic and self-cleaning radiative cooling film, comprising:

1) dissolving P ($VDF_x$-$HFP_y$) and PDMS in a composite polar solvent to obtain a translucent composite polymer solution of P ($VDF_x$-$HFP_y$)/PDMS;

2) adding a non-solvent dropwise to the obtained solution to allow for a phase separation of P ($VDF_x$-$HFP_y$)/PDMS to form a sol; and 3) casting the sol; drying the cast sol to obtain a film with a micro-nano porous structure.

Specifically, step 1 further comprises the following steps.

101) dissolving P ($VDF_x$-$HFP_y$) in an acetone solution under stirring at room temperature for 3~5 h until P ($VDF_x$-$HFP_y$) is completely dissolved in the acetone solution to produce a mixture;

102) adding a prepolymer A for PDMS and a tetrahydrofuran solvent to the resulting mixture in step 101 and stirring uniformly;

103) adding a curing agent B for PDMS under stirring for 15-30 min until the resulting solution is even and translucent.

Further, in step 101, a weight ratio of P ($VDF_x$-$HFP_y$) to acetone is 1:(10-15).

Further, in step 102, a weight ratio of P ($VDF_x$-$HFP_y$) to tetrahydrofuran is (1-2): 15.

Further, in step 103, a weight ratio of P ($VDF_x$-$HFP_y$) to PDMS is (2.0-4.0): 1.0.

Specifically, in step 2, the non-solvent is water, and an adding rate of the water is 0.05 mL per 10 s.

Further, a weight ratio of P ($VDF_x$-$HFP_y$) to the water is 7:(12-6).

Further, the sol is dried at room temperature for 3-5 h.

In a second aspect, the present invention provides a superhydrophobic and self-cleaning radiative cooling film. The film with a micro-nano porous structure has a solar reflectance of 90.1-96.5% and a mid-infrared emissivity of 90.3-94.3%; a water contact angle on a surface of the film is 151.4-162.3°; and a water sliding angle on the surface of the film is 1.4-8.2°.

Compared with the prior art, the present invention has the following beneficial effects.

In the preparation method of the present invention, the composite polymer of P ($VDF_x$-$HFP_y$)/PDMS is induced for a phase separation by water, and a superhydrophobic radiative cooling film with a micro-nano porous structure is directly obtained when the material is formed. All operations are carried out under room temperature, so mild conditions are required in this method. During the preparation of the film, materials can obtain higher solar reflectance and higher mid-infrared emissivity without adding micro or nano-sized particles, and surfaces of the material are not needed to be plated with metal films.

Further, a dense layer is formed when only the P ($VDF_x$-$HFP_y$) is cast at room temperature, but such dense layer will be changed in the present invention due to the addition of polydimethylsiloxane. The micro-roughness required to achieve superhydrophobicity is formed during the formation of the porous structure due to the mass transfer diffusion process in which the two mixed polymers compete in the solvent, and different volatilization mechanisms of the two-component mixed solvent. Such rough network structure may contribute to develop healthy and environmentally friendly particle-free scattering media. Moreover, P ($VDF_x$-$HFP_y$) and PDMS have low-energy surfaces and have good chemical stability. The microstructure formed by the phase separation has excellent superhydrophobicity, which ensures that the passive radiative cooling film will have good weather resistance and a long service life.

Further, the weight ratio of P ($VDF_x$-$HFP_y$) to acetone is 1:(10-15), which allows the polymer to be fully dissolved, so that the solution is avoided to be too viscous to have poor fluidity, and the waste of excess solvents is reduced. The weight ratio of P ($VDF_x$-$HFP_y$) to PDMS was (2.0~4.0): 1.0. It was found that when the two polymers had different ratios, different microscopic morphologies appeared, but the superhydrophobic and self-cleaning radiation cooling effect could be achieved with all ratios. The weight ratio of P ($VDF_x$-$HFP_y$) to tetrahydrofuran is (1~2): 15, which allows PDMS to well disperse in the resulting solution. Moreover, the boiling point of tetrahydrofuran is between that of acetone and that of water, which provides a certain synergistic effect during the evaporation of the solvent to further convert the sol into a porous structure.

Further, in the present invention, water is used as a non-solvent to induce the phase separation, so that the porogen used in the conventional operation is avoided, which is non-toxic and environmentally friendly.

Further, in the present invention, the porous radiative cooling film with superhydrophobic and self-cleaning properties is obtained by drying at normal temperature, so complicated equipment and excess energy consumption are omitted, which can be used for large-scale industrial production.

The superhydrophobic and self-cleaning radiative cooling film has high solar reflectance, high mid-infrared emissivity and superhydrophobic property, so this material has strong radiative cooling effect and excellent antifouling and self-cleaning performance.

In summary, the present invention has a simple preparation method and can realize a large-area production.

Technical solutions of the present invention will be further described in detail below with reference to the accompanying drawings and embodiments.

DETAILED DESCRIPTION OF EMBODIMENTS

In this invention, provided are a superhydrophobic and self-cleaning radiative cooling film and a preparation method thereof. The preparation method comprises the following steps. Poly (vinylidene fluoride-co-hexafluoropropylene) P ($VDF_x$-$HFP_y$) and polydimethylsiloxane (PDMS) are dissolved in a composite polar solvent to obtain a translucent composite polymer solution of P ($VDF_x$-$HFP_y$)/PDMS. Then, the non-solvent water is added dropwise to the solution to allow for a phase separation of P ($VDF_x$-$HFP_y$)/PDMS to obtain a sol. Finally, the sol is cast and dried to obtain a film having a micro-nano porous structure. The prepared film material has a solar reflectance of 96.5% and a mid-infrared emissivity of 94.3%, and the heat is emitted by infrared radiation through a transparent atmospheric window (8~13 µm), thereby lowering the temperature of the object on the lower surface of the film by 5~8° C., achieving good cooling effect. A water contact angle on a surface of the material is 162.3° and a water sliding angle of on the surface of the material is at least 1.4°, which has good antifouling and self-cleaning properties.

The present invention provides a method for preparing a superhydrophobic and self-cleaning radiative cooling film, comprising the following steps.

1) P ($VDF_x$-$HFP_y$) and PDMS are dissolved in a composite polar solvent to obtain a translucent composite polymer solution of P ($VDF_x$-$HFP_y$)/PDMS.

Specifically, step 1 further comprises the following steps.

101) P ($VDF_x$-$HFP_y$) is dissolved in an acetone solution under stirring at room temperature for 3~5 h until P ($VDF_x$-$HFP_y$) is completely dissolved in the acetone solution to produce a mixture, where a weight ratio of P ($VDF_x$-$HFP_y$) to acetone is 1:(10-15).

102) A prepolymer A for PDMS is added into the mixture, and then a tetrahydrofuran solvent is added into the added mixture and stirring uniformly, where a weight ratio of P ($VDF_x$-$HFP_y$) to tetrahydrofuran is (1-2): 15.

103) a curing agent B is added under stirring for 15-30 min until the resulting solution is uniform and translucent, where a weight ratio of P ($VDF_x$-$HFP_y$) to PDMS is (2.0-4.0): 1.0.

2) A non-solvent is dropwise added to the obtained solution to allow for a phase separation of P ($VDF_x$-$HFP_y$)/PDMS to form a sol; where the non-solvent is water, and an adding rate of the water is 0.05 mL per 10 s. A weight ratio of P ($VDF_x$-$HFP_y$) to the water is 7:(12-6).

3) The sol is cast, and the cast sol is dried to obtain a film with a micro-nano porous structure.

The obtained sol is poured into an open container or a surface of a substrate, and is dried at room temperature for 3-5 h to obtain a film having a micro-nano porous structure.

The superhydrophobic and self-cleaning radiative cooling film of the present invention has a solar reflectance of 90.1-96.5% and a mid-infrared emissivity of 90.3-94.3%; a water contact angle on a surface of the film is 151.4-162.3°; and a water sliding angle on the surface of the film is 1.4-8.2°.

The present invention will be clearly and completely described in conjunction with the accompanying drawings and embodiments, from which the purposes, technical solutions and advantages of the present invention will be much clearer. Obviously, the described embodiments are only a part of the embodiments of the present invention. The description of drawings and the components of the embodiments of the invention may be arranged and designed in various configurations. Therefore, the detailed description of the embodiments herein are only a part of the embodiments of the present invention and are not intended to limit the scope of the present invention. Any other embodiments made by the ordinary skilled in the prior art without paying creative efforts based on the embodiments of the present invention shall fall within the scope of the present invention.

Example 1

In this embodiment, illustrated are a superhydrophobic and self-cleaning radiative cooling film and a preparation method thereof. The preparation method comprises the following steps.

Step 1

3.5 g of P ($VDF_x$-$HFP_y$) was dissolved in 49 g of the acetone solution under stirring at room temperature for 3 h until P ($VDF_x$-$HFP_y$) is completely dissolved in the acetone solution to produce a mixture, and then 1 g of the prepolymer A for PDMS and 30 g of tetrahydrofuran were added in sequence, and the mixture was stirred uniformly, and then 0.1 g of a curing agent B was added into the mixture, and the resulting solution was uniformly stirred for 15 min to obtain a translucent solution.

Step 2

3.0 g of water was added dropwise to the translucent solution at a rate of 0.05 mL per 10 s under stirring to form a sol.

Step 3

The obtained sol was poured into a Petri dish of 90 mm and dried at room temperature for 3 h until the solvent and water were completely evaporated, and then a microporous radiative cooling film with superhydrophobic and self-cleaning properties was obtained.

The radiative cooling film of this embodiment has a solar reflectance of 94.2% and a mid-infrared emissivity of 93.5%; a water contact angle on a surface of the film is 153.0±0.8°; and a water sliding angle on a surface of the film is 6.1±0.5°.

Example 2

In this embodiment, illustrated are a superhydrophobic and self-cleaning radiative cooling film and a preparation method thereof. The preparation method comprises the following steps.

Step 1

3.5 g of P ($VDF_x$-$HFP_y$) was dissolved in 42 g of the acetone solution under stirring at room temperature for 3.5 h until P ($VDF_x$-$HFP_y$) is completely dissolved in the acetone solution to form a mixture, and then 1 g of prepolymer A for PDMS and 30 g of the tetrahydrofuran solvent were added into the mixture in sequence, and the mixture was stirred uniformly, and then 0.1 g of a curing agent B was added, and the resulting solution was evenly stirred for 30 min to obtain a translucent solution.

Step 2

5.0 g of water was added dropwise to the translucent solution at a rate of 0.05 mL per 10 s under stirring to form a sol.

Step 3

The obtained sol was poured into a Petri dish of 90 mm and dried at room temperature for 4 h until the solvent and water were completely evaporated, and then a microporous radiative cooling film with superhydrophobic and self-cleaning properties was obtained.

The radiative cooling film of this embodiment has a solar reflectance of 96.5% and a mid-infrared emissivity of 94.3%; a water contact angle on a surface of the film is 158.0±1.7°; and a water sliding angle on a surface of the film is 3.0±0.5°.

Example 3

In this embodiment, illustrated are a superhydrophobic and self-cleaning radiative cooling film and a preparation method thereof. The preparation method comprises the following steps.

Step 1

3.0 g of P ($VDF_x$-$HFP_y$) was dissolved in 36 g of the acetone solution under stirring at room temperature for 5 h until P ($VDF_x$-$HFP_y$) was completely dissolved in the acetone solution to form a mixture, and then 1 g of prepolymer A for PDMS and 30 g of the tetrahydrofuran solvent were added into the mixture in sequence, and then the mixture was stirred uniformly, and then 0.1 g of a curing agent B was added into the mixture, and the resulting solution was evenly stirred for 20 min to obtain a translucent solution.

Step 2

3.4 g of water was added dropwise to the translucent solution at a rate of 0.05 mL per 10 s under stirring to form a sol.

Step 3

The obtained sol was poured into a Petri dish of 90 mm and dried at room temperature for 5 h until the solvent and water were completely evaporated, and then a microporous radiative cooling film with superhydrophobic and self-cleaning properties was obtained.

The radiative cooling film of this embodiment has a solar reflectance of 95.7% and a mid-infrared emissivity of 93.4%; a water contact angle on a surface of the film is 156.0±1.3°; and a water sliding angle on a surface of the film is 5.3±0.8°.

Example 4

In this embodiment, illustrated are a superhydrophobic and self-cleaning radiative cooling film and a preparation method thereof. The preparation method comprises the following steps.

Step 1

4.0 g of P ($VDF_x$-$HFP_y$) was dissolved in 48 g of the acetone solution under stirring at room temperature for 3.5 h until P ($VDF_x$-$HFP_y$) was completely dissolved in the acetone solution to form a mixture, and then 1 g of a prepolymer A for PDMS and 30 g of the tetrahydrofuran solvent were added in sequence into the mixture, and then the mixture was stirred uniformly, and then 0.1 g of a curing agent B was added into the mixture, and the resulting solution was uniformly stirred for 25 min to obtain a translucent solution.

Step 2

5.7 g of water was added dropwise to the translucent solution at a rate of 0.05 mL per 10 s under stirring to form a sol.

Step 3

The obtained sol was poured into a Petri dish of 90 mm and dried at room temperature for 3 h until the solvent and water were completely evaporated, and then a microporous radiative cooling film with superhydrophobic and self-cleaning properties was obtained.

The radiative cooling film of this embodiment has a solar reflectance of 93.6% and a mid-infrared emissivity of 94.1%; a water contact angle on a surface of the film is 162.3±1.0°; and a water sliding angle on a surface of the film is 2.0±0.6°.

Example 5

In this embodiment, illustrated are a superhydrophobic and self-cleaning radiative cooling film and a preparation method thereof. The preparation method comprises the following steps.

Step 1

3.5 g of P (VDF$_x$-HFP$_y$) was dissolved in 42 g of the acetone solution under stirring at room temperature for 3 h until P (VDF$_x$-HFP$_y$) was completely dissolved in the acetone solution to form a mixture, and then 1 g of the prepolymer A for PDMS and 30 g of the tetrahydrofuran solvent were added in sequence into the mixture, and the mixture was stirred uniformly, and then 0.1 g of a curing agent B was added into the mixture, and the resulting solution was uniformly stirred for 15 min to obtain a translucent solution.

Step 2

4.0 g of water was added dropwise to the translucent solution at a rate of 0.05 ml per 10 s under stirring to form a sol.

Step 3

The obtained sol was poured into a Petri dish of 90 mm and dried at room temperature for 4 h until the solvent and water were completely evaporated, and then a microporous radiative cooling film with superhydrophobic and self-cleaning properties was obtained.

The radiative cooling film of this embodiment has a solar reflectance of 95.6% and a mid-infrared emissivity of 93.8%; a water contact angle on a surface of the film is 157.3±0.6°; and a water sliding angle on a surface of the film is 4.9±0.3°.

Example 6

In this embodiment, illustrated are a superhydrophobic and self-cleaning radiative cooling film and a preparation method thereof. The preparation method comprises the following steps.

Step 1

3.5 g of P (VDF$_x$-HFP$_y$) was dissolved in 49 g of the acetone solution under stirring at room temperature for 3.5 h until P (VDF$_x$-HFP$_y$) was completely dissolved in the acetone solution to form a mixture, and then 1 g of the prepolymer A for PDMS and 30 g of the tetrahydrofuran solvent were added in sequence into the mixture, and the mixture was stirred uniformly, and then 0.1 g of the curing agent B was added into the mixture, and the resulting solution was uniformly stirred for 30 min to obtain a translucent solution.

Step 2

6.0 g of water was added dropwise to the translucent solution at a rate of 0.05 ml per 10 s under stirring to form a sol.

Step 3

The obtained sol was poured into a Petri dish of 90 mm and dried at room temperature for 3 h until the solvent and water were completely evaporated, and then a microporous radiative cooling film with superhydrophobic and self-cleaning properties was obtained.

The radiative cooling film of this embodiment has a solar reflectance of 95.2% and a mid-infrared emissivity of 93.6%; a water contact angle on a surface of the film is 156.2±0.6°; and a water sliding angle on a surface of the film is 4.2±0.5°.

Example 7

In this embodiment, illustrated are a superhydrophobic and self-cleaning radiative cooling film and a preparation method thereof. The preparation method comprises the following steps.

Step 1

2.0 g of P (VDF$_x$-HFP$_y$) was dissolved in 28 g of the acetone solution under stirring at room temperature for 3 h until P (VDF$_x$-HFP$_y$) was completely dissolved in the acetone solution to form a mixture, and then 1 g of a prepolymer A for PDMS and 30 g of the tetrahydrofuran solvent were added in sequence into the mixture, and the mixture was stirred uniformly, and then 0.1 g of a curing agent B was added into the mixture, and the resulting solution was uniformly stirred for 20 min to obtain a translucent solution.

Step 2

2.9 g of water was added dropwise to the translucent solution at a rate of 0.05 ml per 10 s under stirring to form a sol.

Step 3

The obtained sol was poured into a Petri dish of 90 mm and dried at room temperature for 4 h until the solvent and water were completely evaporated, and then a microporous radiative cooling film with superhydrophobic and self-cleaning properties was obtained.

The radiative cooling film of this embodiment has a solar reflectance of 90.1% and a mid-infrared emissivity of 93.2%; a water contact angle on a surface of the film is 151.4±0.5°; and a water sliding angle on a surface of the film is 8.2±0.7°.

Comparative Example 1

Step 1

3.5 g of P (VDF$_x$-HFP$_y$) was dissolved in 42 g of the acetone solution under stirring at room temperature for 3 h until P (VDF$_x$-HFP$_y$) was completely dissolved in the acetone solution.

Step 2

The obtained solution was poured into a Petri dish of 90 mm and dried at room temperature for 2 h until the solvent and water were completely evaporated, and then an optically transparent plastic film was obtained.

The optically transparent plastic film has a solar reflectance of 8.3% and a mid-infrared emissivity of 92.5%; a water contact angle on a surface of the optically transparent plastic film is 92.3±0.2°; and a water sliding angle on the surface of the optically transparent plastic film is 0°.

Comparative Example 2

Step 1

3.5 g of P (VDF$_x$-HFP$_y$) was dissolved in 42 g of the acetone solution under stirring at room temperature for 3 h until P (VDF$_x$-HFP$_y$) was completely dissolved in the acetone solution.

Step 2

4.0 g of water was added dropwise to the translucent solution at a rate of 0.05 ml per 10 s under stirring to form a sol.

Step 3

The obtained sol was poured into a Petri dish of 90 mm and dried at room temperature for 3 h until the solvent were completely evaporated, and then a porous film was obtained.

The porous film has a solar reflectance of 87.9% and a mid-infrared emissivity of 92.9%; a water contact angle on a surface of the porous film is 118.2±0.4°; and a water sliding angle on the surface of the porous film is 0°.

The test items involved in the present invention are the reflectance R, the infrared radiance E, the contact angle CA, and the sliding angle SA.

The test results are shown in the following table:

the phase separation. In Comparative Example 1, only P (VDF$_x$-HFP$_y$) was dissolved in acetone, and no water was added. The solar reflectance of the superhydrophobic and self-cleaning radiation cooling material prepared in the embodiments of the present invention is about 12 times of that of Comparative Example 1, and has excellent self-cleaning performance compared with Comparative Example 1. In Comparative Example 2, only P (VDF$_x$-HFP$_y$) was dissolved in acetone, and the water was added. The solar reflectance of the superhydrophobic and self-cleaning radiation cooling material prepared in the embodiments of the present invention is significantly higher than that of Comparative Example 2. Moreover, in the present invention, the contact angle is increased to 150° or more, and the sliding angle is close to 0°, and the surface formed in Comparative Example 2 enables water to slide thereon, and the surface dirt cannot be taken away.

Figure 1:
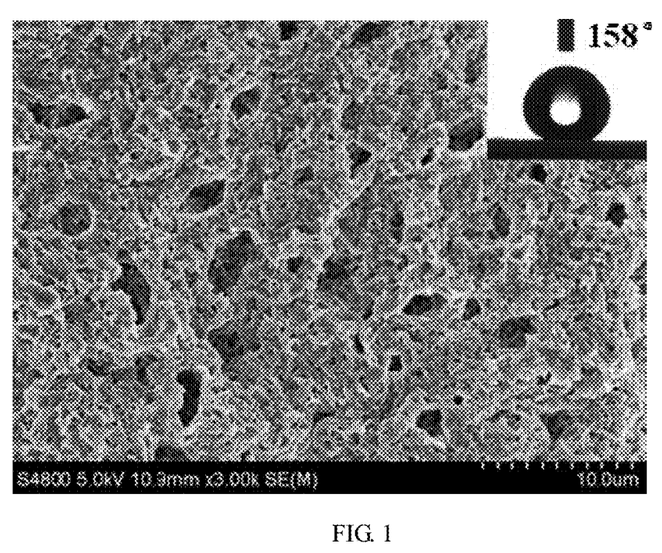
FIG. 1 is an image showing a morphology and a water contact angle on a surface of a superhydrophobic and self-cleaning radiative cooling film obtained in Example 2 of the present invention.

Referring to FIG. 1, the surface of the superhydrophobic and self-cleaning radiative cooling film obtained in Example 2 of the present invention has a micro-nano porous structure, and a micro-nano roughness is accordingly formed due to the porous structure, and the water contact angle is up to 158°.

Figure 2:
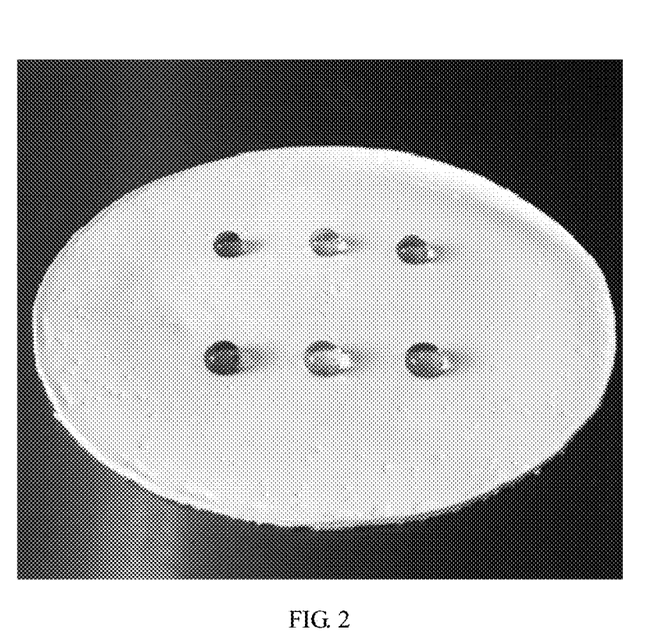
FIG. 2 is a picture of the superhydrophobic and self-cleaning cooling film obtained in Example 2 of the present invention, showing the state of colored water drops on the film.

Referring to FIG. 2, the superhydrophobic and self-cleaning radiative cooling film obtained in Example 2 is white matt, and water drops stand on the surface thereof in a spherical shape.

Figure 3:
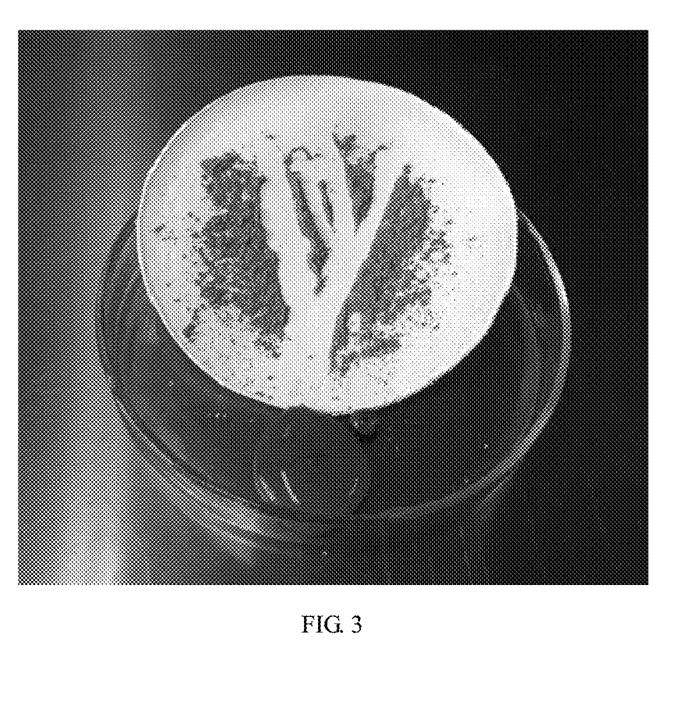
FIG. 3 is an image showing a self-cleaning effect of the superhydrophobic and self-cleaning radiative cooling film obtained in Example 2 of the present invention.

Referring to FIG. 3, the superhydrophobic and self-cleaning radiative cooling film obtained in Example 2 of the present invention has an excellent self-cleaning effect, and water drops can remove the dirt on the film when passing through a place with dirt, thereby achieving a self-cleaning effect.

Figure 4:
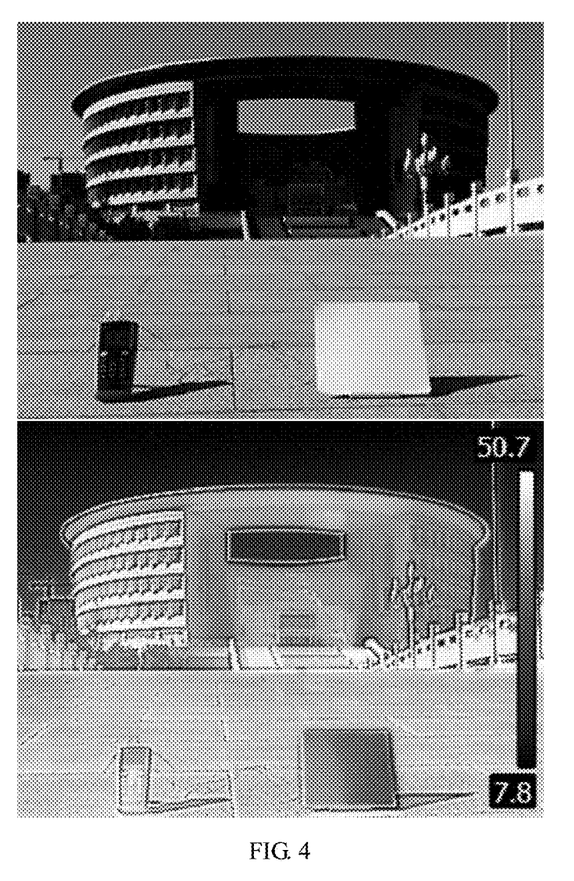
FIG. 4 is an image showing thermal infrared imaging of the superhydrophobic and self-cleaning radiative cooling film under a solar irradiation environment obtained in Example 6 of the present invention.

Referring to FIG. 4, the superhydrophobic and self-cleaning radiative cooling film obtained in Example 6 is placed in the practical environment (tested in *Shaanxi University of Science & Technology*, Xi'an, Shaanxi, China, on Aug. 14, 2019, 3:50 pm; outdoor temperature: about 40° C.). The infrared camera observed that all objects on the ground are heated to above 50° C. by the sun, and surface temperature thereof are kept at about 40° C. by using the prepared film of the present invention without isolating heat convection and heat conduction. This proved that the film prepared in the invention has a good radiation self-cooling effect.

As can be seen from Table 1, in the present invention, P (VDF$_x$-HFP$_y$) and PDMS are induced for the phase separation in the composite solvent and water to form a micro-nano porous structure, and a micro-nano roughness is formed on

TABLE 1

Test results of Examples and Comparative Examples

|  | Ex. 1 | Ex. 2 | Ex. 3 | Ex. 4 | Ex. 5 | Ex. 6 | Ex. 7 | Comparative Ex. 1 | Comparative Ex. 2 |
|---|---|---|---|---|---|---|---|---|---|
| R (%) | 94.2 | 96.5 | 95.7 | 93.6 | 95.6 | 95.2 | 90.1 | 8.3 | 87.9 |
| E (%) | 93.5 | 94.3 | 93.4 | 94.1 | 93.8 | 93.6 | 93.2 | 92.5 | 92.9 |
| CA (°) | 153.0 ± 0.8 | 158.0 ± 1.7 | 156.0 ± 1.3 | 162.3 ± 1.0 | 157.0 ± 0.6 | 156.2 ± 0.6 | 151.4 ± 0.5 | 92.3 ± 0.2 | 118.2 ± 0.4 |
| SA (°) | 6.1 ± 5 | 3.0 ± 5 | 5.3 ± 8 | 2.0 ± 6 | 4.9 ± 3 | 4.2 ± 5 | 8.2 ± 7 | — | — |

In the embodiments of the present invention, P (VDF$_x$-HFP$_y$) and PDMS were dissolved in a composite polar solvent of acetone and tetrahydrofuran, and were induced for the surface. The P (VDF$_x$-HFP$_y$) and PDMS cooperate with each other to have high solar reflectance and self-cleaning performance. The present invention is simple in operating, and is suitable for the large-scale production, and can be applied on surfaces of objects with various shapes, such as buildings, vehicles, outdoor products, and low-temperature storage facilities. The present invention has a broad application prospect and is important to save power resources and reduce energy consumption to slow down the global warming trend.

The above description is only for illustration, and is not intended to limit the scope of the present invention. Any modifications made on the basis of technical solutions of the present invention shall fall within the scope of the present invention.

What is claimed is:

1. A method for preparing a superhydrophobic and self-cleaning radiative cooling film, comprising:
   1) dissolving Poly (vinylidene fluoride-co-hexafluoropropylene) P (VDFx-HFPy) and polydimethylsiloxane (PDMS) in a composite polar solvent to obtain a translucent composite polymer solution of P (VDFx-HFPy)/PDMS;
   2) adding a non-solvent dropwise to the obtained solution to allow for a phase separation of P (VDFx-HFPy)/PDMS to form a sol; and
   3) casting the sol; drying the cast sol to obtain a film with a micro-nano porous structure; and
   wherein the superhydrophobic and self-cleaning radiative cooling film with a micro-nano porous structure has a solar reflectance of 90.1-96.5% and a mid-infrared emissivity of 90.3-94.3% at thickness of 8-13 µm; a water contact angle on a surface of the film is 151.4-162.3°; and a water sliding angle on the surface of the film is 1.4-8.2°.

2. The method of claim 1, wherein step 1 further comprises:
   101) dissolving P (VDFx-HFPy) in an acetone solution under stirring at room temperature for 3-5 h until P (VDFx-HFPy) is completely dissolved in the acetone solution to produce a mixture;
   102) adding a prepolymer A for PDMS and a tetrahydrofuran solvent to the resulting mixture in step 101) and stirring uniformly;
   103) adding a curing agent B under stirring for 15-30 min until the resulting solution is uniform and translucent.

3. The method of claim 2, wherein in step 101, a weight ratio of P (VDFx-HFPy) to acetone is 1:10-15.

4. The method of claim 2, wherein in step 102, a weight ratio of P ($VDF_x$-HFPy) to tetrahydrofuran is 1-2:15.

5. The method of claim 2, wherein in step 103, a weight ratio of P ($VDF_x$-HFPy) to PDMS is 2.0-4.0:1.0.

6. The method of claim 1, wherein in step 2, the non-solvent is water, and an adding rate of the water is 0.05 mL per 10 s.

7. The method of claim 6, wherein a weight ratio of P ($VDF_x$-HFPy) to the water is 7:12-6.

8. The method of claim 1, wherein in step 3, the sol is dried at room temperature for 3-5 h.

* * * * *